United States Patent [19]

Aagano

[11] Patent Number: 4,582,988
[45] Date of Patent: Apr. 15, 1986

[54] RADIATION IMAGE READ-OUT APPARATUS

[75] Inventor: Toshitaka Aagano, Kanagawa, Japan

[73] Assignee: Fuji Photo Film Co., Ltd., Kanagawa, Japan

[21] Appl. No.: 642,868

[22] Filed: Aug. 21, 1984

[30] Foreign Application Priority Data

Aug. 23, 1983 [JP] Japan .................. 58-153691

[51] Int. Cl.⁴ .............................................. G03C 5/16
[52] U.S. Cl. ............................ 250/327.2; 250/484.1
[58] Field of Search .................. 250/484.1, 327.2, 347

[56] References Cited

U.S. PATENT DOCUMENTS 4,091,284 5/1978 Yamamoto et al. ............. 250/484.1
4,346,295 8/1982 Tanaka et al. .................... 250/327.2

*Primary Examiner*—Carolyn E. Fields
*Attorney, Agent, or Firm*—Sughrue, Mion, Zinn, Macpeak and Seas

[57] ABSTRACT

A radiation image read-out apparatus comprises devices for scanning a stimulable phosphor sheet carrying a radiation image stored therein by stimulating rays in a main scanning direction and in a sub-scanning direction. A light guide member having a light input face extending in the main scanning direction and a light output face closely contacted with a photodetector is positioned above the stimulable phosphor sheet. An aperture member is positioned between the surface of the stimulable phosphor sheet and the light input face of the light guide member. The aperture member is provided with an aperture for allowing stimulating rays to impinge upon the stimulable phosphor sheet and for allowing light emitted by the stimulable phosphor sheet upon stimulation thereof by the stimulating rays to enter the light input face of the light guide member, and light shielding sections positioned adjacently to the aperture on opposite sides thereof in the sub-scanning direction.

4 Claims, 6 Drawing Figures

RADIATION IMAGE READ-OUT APPARATUS

BACKGROUND OF THE INVENTION

1. Field of the Invention

This invention relates to an apparatus for reading out a radiation image stored in a stimulable phosphor sheet. This invention particularly relates to a radiation image read-out apparatus wherein light emitted by the stimulable phosphor sheet upon stimulation thereof in proportion to the radiation energy stored is detected accurately.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored therein, and is then scanned with stimulating rays such as a laser beam which cause it to emit light in proportion to the radiation energy stored. The light emitted from the stimulable phosphor sheet upon simulation thereof is photoelectrically detected and converted to an electric image signal, which is processed as desired to reproduce a visible image having an improved quality, particularly a high diagnostic efficiency and accuracy.

FIG. 1 is a schematic view showing an example of a radiation image read-out apparatus employed in the aforesaid radiation image recording and reproducing system.

In the apparatus of FIG. 1, a laser beam 1a of a predetermined intensity is emitted as stimulating rays by a laser beam source 1 to a galvanometer mirror 2. The laser beam 1a is deflected by the galvanometer mirror 2 to form a laser beam 1b impinging upon a stimulable phosphor sheet 3 positioned below the galvanometer mirror 2 so that the sheet 3 is scanned by the laser beam 1b in the main scanning direction, i.e. in the width direction of the sheet 3 as indicated by the arrow A. While the laser beam 1b impinges upon the stimulable phosphor sheet 3, the sheet 3 is conveyed in the sub-scanning direction as indicated by the arrow B, for example, by an endless belt device 9. Therefore, scanning in the main scanning direction is repeated approximately at right angle with respect to the sub-scanning direction, and the whole surface of the stimulable phosphor sheet 3 is two-dimensionally scanned by the laser beam 1b. As the stimulable phosphor sheet 3 is scanned by the laser beam 1b, the portion of the sheet 3 exposed to the laser beam 1b emits light having an intensity proportional to the radiation energy stored. The light emitted by the stimulable phosphor sheet 3 enters a transparent light guide member 4 from its light input face 4a positioned close to the sheet 3 in parallel to the main scanning line. The light guide member 4 has a flat-shaped front end portion 4b positioned close to the stimulable phosphor sheet 3 and is shaped gradually into a cylindrical shape towards the rear end side to form an approximately cylindrical rear end portion 4c which is closely contacted with a photomultiplier 5. The light emitted by the stimulable phosphor sheet 3 upon stimulation thereof and entering the light guide member 4 from its light input face 4a is guided inside of the light guide member 4 up to the rear end portion 4c, and received by the photomultiplier 5. Thus the light emitted by the stimulable phosphor sheet 3 in proportion to the radiation energy stored therein is detected and converted into an electric image signal by the photomultiplier 5. The electric image signal thus obtained is sent to an image processing circuit 6 and processed therein. The electric image signal thus processed is then reproduced into a visible image and displayed, for example, on a CRT 7, or stored in a magnetic tape 8, or directly reproduced as a hard copy on a photographic material or the like.

In this manner, the radiation image stored in the stimulable phosphor sheet 3 is read out. However, since the light input face 4a of the light guide member 4 extends approximately over the entire width of the stimulable phosphor sheet 3 in parallel to the main scanning line thereon, all light emitted by the portions of the stimulable phosphor sheet 3 viewing the light input face 4a enters the light guide member 4 from the light input face 4a and is detected by the photomultiplier 5. That is, not only the light emitted by the portion of the stimulable phosphor sheet 3 upon which the laser beam 1b impinges at any given instant is read out, but also the light which is emitted as described below by the other portions of the sheet 3 and which can reach the light input face 4a enters the light guide member 4 and are detected by the photomultiplier 5. The light other than the light emitted by the portion of the stimulable phosphor sheet 3 upon which the laser beam 1b impinges at any given instant includes after-glows emitted by the stimulable phosphor sheet 3. The after-glows are divided into an instantaneous light emission after-glow and a stimulated light emission after-glow.

By "instantaneous light emission after-glow" is meant the after-glow of light instantaneously emitted by a stimulable phosphor sheet when the sheet is exposed to a radiation to have a radiation image stored in the sheet, the after-glow continuing to be emitted by the sheet while the light intensity decays after the exposure of the sheet to the radiation is ceased. The characteristics of the instantaneous light emission after-glow are generally as shown in FIG. 2, though they will differ depending on the type of the stimulable phosphor constituting the stimulable phosphor sheet. In the graph of FIG. 2, the ordinate represents the intensity of light emission and the abscissa represents time (t). As shown in FIG. 2, when the exposure of a stimulable phosphor sheet to a radiation is ceased after the sheet is exposed to the radiation for a period of $\Delta t2$ from a time t1 to a time t2, the intensity of light instantaneously emitted by the sheet at a light emission intensity A does not immediately decreases to zero, but instead an instantaneous light emission after-glow continues while the intensity thereof decreases along an exponential function curve the time constant of which increases gradually.

For example, decay of the light emission intensity of the instantaneous light emission after-glow is such that a light emission intensity B of the instantaneous light emission after-glow at a time t3 approximately 180 seconds after the exposure of a stimulable phosphor sheet to a radiation is ceased (i.e. t3−t2=180 seconds) is approximately $10^{-4}$ times the intensity of light emitted by the sheet when the sheet is exposed to stimulating rays.

Accordingly, in the case where a predetermined time elapses from when a stimulable phosphor sheet is exposed to a radiation passing through an object to have a radiation image stored in the sheet to when read out of the radiation image stored is conducted, the intensity of the instantaneous light emission after-glow decreases sufficiently and the effect of the after-glow becomes negligible in the read-out step. However, when read-out of the radiation image is conducted immediately after the radiation image is stored in the stimulable phosphor sheet, for example, when a built-in type radiation image recording and reproducing system wherein an image recording section and an image read-out section are installed integrally to record and read out many radiation images continuously and quickly is employed, the light emission intensity of the instantaneous light emission after-glow does not decay sufficiently before image read-out is conducted. As a result, the instantaneous light emission after-glow is detected together with the light emitted by the stimulable phosphor sheet in proportion to the radiation energy stored when the sheet is exposed to simulating rays, and the effect of the instantaneous light emission after-glow on the electric image signals obtained thereby becomes large.

Further, the light emission by the stimulable phosphor sheet upon stimulation thereof by stimulating rays arises from a portion having a very small area upon which the stimulating rays impinge, whereas the instantaneous light emission after-glow is emitted by the whole surface of the stimulable phosphor sheet exposed to a radiation. Therefore, as the stimulable phosphor sheet 3 is scanned point by point by the laser beam 1b as shown in FIG. 1, the light emitted by a portion of the sheet 3 upon which the laser beam 1b impinges momentarily in proportion to the radiation energy stored in that portion and the instantaneous light emission after-glow emitted by all of the portions viewing the light input face 4a of the light guide member 4 simultaneously enter the light guide member 4 from the light input face 4a and are guided to the photomultiplier 5. In this case, since the area of the portions viewing the light input face 4a of the light guide member 4 is markedly larger than the area of the portion of the stimulable phosphor sheet 3 upon which the laser beam 1b impinges momentarily, the amount of the instantaneous light emission after-glow guided to the photomultiplier 5 becomes not negligible even though a predetermined time elapses after the exposure of the stimulable phosphor sheet 3 to a radiation is ceased and the intensity of the instantaneous light emission after-glow becomes negligibly low as compared with the intensity of the light emitted by the sheet 3 upon stimulation thereof.

By "stimulated light emission after-glow" is meant the after-glow of light emitted by a stimulable phosphor sheet carrying a radiation image stored therein when the sheet is exposed to stimulating rays (e.g. a laser beam) for reading out the radiation image, the after-glow continuing to be emitted by the sheet while the light intensity decays after the exposure of the sheet to the stimulating rays is ceased. The characteristics of the stimulated light emission after-glow are generally as shown in FIG. 3, though they will differ depending on the type of the stimulable phosphor constituting the stimulable phosphor sheet. In the graph of FIG. 3, the ordinate represents the intensity of light emission and the abscissa represents time(t). As shown in FIG. 3, when the exposure of a stimulable phosphor sheet to stimulating rays is ceased after the sheet is exposed to the stimulating rays for a period of $\Delta t5$ from a time t4 to a time t5, the intensity of light emitted by the sheet upon stimulation thereof at a light emission intensity C does not immediately decreases to zero, but instead a stimulated light emission after-glow continues while the intensity thereof decreases along an exponential function curve with the time constant thereof increasing gradually. (That is, the light intensity decreases rapidly at the beginning and thereafter the rate of decrease in the light intensity becomes gradually lower.)

For example, decay of the light emission intensity of the stimulated light emission after-glow is such that the initial time constant is approximately one microsecond, i.e. the time t6−t5 required for the light emission intensity to become 1/e (D/C=1/e) is approximately one microsecond. In general, since the speed of scanning (in the main scanning direction) of a stimulable phosphor sheet by stimulating rays by use of a galvanometer mirror is approximately 50 Hz, it takes approximately 20,000 microseconds for scanning one time. Accordingly, the intensity of the stimulated light emission after-glow decaying along an exponential function curve with the initial time constant of one microsecond becomes very low as compared with the intensity of light emitted by the stimulable phosphor sheet upon stimulation thereof when the sheet is exposed to the stimulating rays. Thus the intensity of the stimulated light emission after-glow at each point of the stimulable phosphor sheet becomes almost negligible.

However, the light emission by the stimulable phosphor sheet upon stimulation thereof when the sheet is exposed to stimulating rays arises from a portion having a very small area upon which the stimulating rays impinge, whereas the stimulated light emission after-glow is emitted by the whole surface of the stimulable phosphor sheet scanned by the stimulating rays. Therefore, as the stimulable phosphor sheet 3 is scanned point by point by the laser beam 1b as shown in FIG. 1, the light emitted by a portion of the sheet 3 upon which the laser beam 1b impinges momentarily and the stimulated light emission after-glow which is emitted by the scanned portions and which can reach the light input face 4a of the light guide member 4 simultaneously enter the light guide member 4 from the light input face 4a and are guided to the photomultiplier 5. In this case, since the area of the portions viewing the light input face 4a of the light guide member 4 is markedly larger than the area of the portion of the stimulable phosphor sheet 3 which is momentarily exposed to the laser beam 1b and which emits light upon stimulation by the laser beam 1b, the amount of the stimulated light emission after-glow guided to the photomultiplier 5 becomes not negligible even though the intensity of the stimulated light emission after-glow becomes negligible low as compared with the intensity of the light emitted by the sheet 3 upon stimulation thereof.

The after-glow detected together with the light emitted by the stimulable phosphor sheet upon stimulation thereof by stimulating rays as described above constitutes a noise component in the electric image signals obtained by the read-out of a radiation image and make it difficult to accurately read out the radiation image.

The instantaneous light emission after-glow presents a problem particularly when image read-out is carried out immediately after a stimulable phosphor sheet is exposed to a radiation to have the radiation image stored therein. On the other hand, the stimulated light emission after-glow presents a problem particularly when the scanning speed of stimulating rays on the stimulable phosphor sheet carrying the radiation image stored therein is increased.

The effects of the after-glows on the amount of light detected by image read-out will hereinbelow be described in more detail with reference to FIGS. 4A and 4B. FIG. 4A shows a stimulable phosphor sheet $3a$ carrying a radiation image of the head of a human body stored therein. FIG. 4B shows a graph wherein the abscissa represents the scanning point along the line a on the stimulable phosphor sheet $3a$ of FIG. 4A and the ordinate represents the amount of light transmitted to a photomultiplier via a light guide member when the stimulable phosphor sheet $3a$ is scanned by stimulating rays (laser beam) along the line a. In FIG. 4B, the broken line 11 designates the amount of light actually transmitted to the photomultiplier, and the solid line 12 designates the amount of light emitted by the stimulable phosphor sheet $3a$ upon stimulation thereof when the sheet $3a$ is exposed to the stimulating rays. The chain line 13 designates the amount of after-glows (i.e. the sum of the instantaneous light emission after-glow and the stimulated light emission after-glow). That is, the sum of the amount 13 of the after-glows and the amount 12 of the light emitted by the stimulable phosphor sheet $3a$ upon stimulation thereof when the sheet $3a$ is exposed to the stimulating rays is equal to the light amount 11 transmitted to the photomultiplier. The light amount 11 is converted to an electric image signal by the photomultiplier and then logarithmically converted to reproduce a visible image by use of the logarithmically converted signal. In this case, the signal level obtained when the light amount 11 transmitted to the photomultiplier is converted to an electric image signal and then logarithmically converted is different from the signal level obtained when only the amount 12 of light emitted by the stimulable phosphor sheet $3a$ upon stimulation thereof by the stimulating rays is converted to an electric image signal and then logarithmically converted. Therefore, when a visible image is reproduced by use of the image signal obtained by converting the light amount 11 transmitted to the photomultiplier, the visible image thus reproduced becomes different from the correct image. That is, the visible image reproduced becomes incorrect or unsharp, and a very real problem arises with regard to the image quality, particularly diagnostic efficiency and accuracy.

Besides the after-glow problems as described above, the problem that a part of the laser beam $1b$ is reflected by the surface of the stimulable phosphor sheet 3, and the reflected light is further reflected by the light input face $4a$ of the light guide member 4 to a non-scanned portion of the sheet 3 outside of the scanned portion thereof, thereby stimulating the stimulable phosphor at the non-scanned portion to emit light, often arises. When the light emitted by the non-scanned portion of the stimulable phosphor sheet 3 outside of the scanned portion thereof is detected by the photomultiplier, the light constitutes a noise component in the electric image signal obtained thereby, and the sharpness of the image reproduced by use of the electric image signal is deteriorated.

SUMMARY OF THE INVENTION

The primary object of the present invention is to provide an apparatus for reading out a radiation image, which minimizes adverse effects of the instantaneous light emission after-glow, the stimulated light emission after-glow, and the light emitted by a non-scanned portion of a stimulable phosphor sheet outside of the scanned portion thereof upon stimulation of the non-scanned portion by the reflected stimulating rays, on the read-out.

Another object of the present invention is to provide an apparatus for reading out a radiation image, which prevents the instantaneous light emission after-glow, the stimulated light emission after-glow, and the light emitted by a non-scanned portion of the stimulable phosphor sheet outside of the scanned portion thereof upon stimulation of the non-scanned portion by the reflected stimulating rays from entering the light guide member.

The apparatus for reading out a radiation image in accordance with the present invention comprises:

(i) a main scanning means for scanning a stimulable phosphor sheet, which carries a radiation image of an object stored therein, by stimulating rays in a main scanning direction, (ii) a sub-scanning means for scanning said stimulable phosphor sheet in a sub-scanning direction by moving said stimulable phosphor sheet with respect to said stimulating rays in a direction approximately at right angle with respect to said main scanning direction, (iii) a light guide member provided with a light input face extending in said main scanning direction, said light input face being positioned along and close to the main scanning line, so that light entering from said light input face is guided inside of said light guide member up to a light output face thereof, (iv) a photodetector closely contacted with said light output face of said light guide member, and (v) an aperture member positioned between the surface of said stimulable phosphor sheet and said light input face of said light guide member, and provided with an aperture for allowing said stimulating rays to impinge upon said stimulable phosphor sheet for scanning it in the main scanning direction and for allowing the light emitted by said stimulable phosphor sheet upon stimulation thereof by said stimulation rays to enter said light input face of said light guide member, and light shielding sections positioned adjacently to said aperture on the front side and the rear side thereof in the sub-scanning direction.

In the read-out apparatus of the present invention, the aperture member is positioned between the light input face of the light guide member for collecting the light emitted by the stimulable phosphor sheet upon stimulation thereof and the portion of the stimulable phosphor sheet scanned by stimulating rays. The aperture member allows only the light emitted by the portion of the stimulable phosphor sheet, which is momentarily scanned by stimulating rays, upon stimulation thereof to enter the light input face of the light guide member and prevents the light (corresponding to the after-glows) emitted by the other portions of the stimulable phosphor sheet.

That is, in the read-out apparatus of the present invention, the aperture member acting in the same manner as a mask is positioned to cover the portions of the stimulable phosphor sheet along the previous scanning lines and the coming scanning lines so that the afterglows do not enter the light guide member and only the light emitted by the portions of the stimulable phosphor sheet along the scanning line currently being scanned (in some cases, also including the scanning line just prior to the current scanning point) enters the light guide member.

The aperture member is fabricated of an opaque material and is provided with the aperture for allowing the stimulating rays for scanning to impinge upon the stimulable phosphor sheet and for allowing the light emitted by the stimulable phosphor sheet upon stimulation thereof to enter the light guide member. It is also provided with the light shielding sections for preventing the instantaneous light emission after-glow emitted by the portions of the stimulable phosphor sheet which are scanned next and the stimulated light emission afterglow (and the instantaneous light emission after-glow) emitted by the portions of the sheet scanned previously from entering the light guide member.

In the read-out apparatus of the present invention, the after-glows are prevented from entering the light guide member from the light input face thereof, and the light emitted by the stimulable phosphor sheet upon stimulation thereof by stimulating rays is allowed to enter the light guide member. Therefore, it is possible to minimize adverse effects of the after-glows on the read-out. Further, a part of stimulating rays reflected by the surface of the stimulable phosphor sheet is prevented from impinging upon the light input face of the light guide member or the part of stimulating rays reflected by the sheet surface is prevented from being reflected by the light input face and returned to a non-scanned portion of the sheet outside of the scanned portion thereof. Therefore, the problem that light is emitted by the non-scanned portion of the sheet outside of the scanned portion thereof upon stimulation of the non-scanned portion by the reflected stimulating rays does not arise. Accordingly, it is possible to obtain a reproduced image having high sharpness.

DESCRIPTION OF THE PREFERRED EMBODIMENTS

The present invention will hereinbelow be described in further detail with reference to the accompanying drawings.

Figure 1:
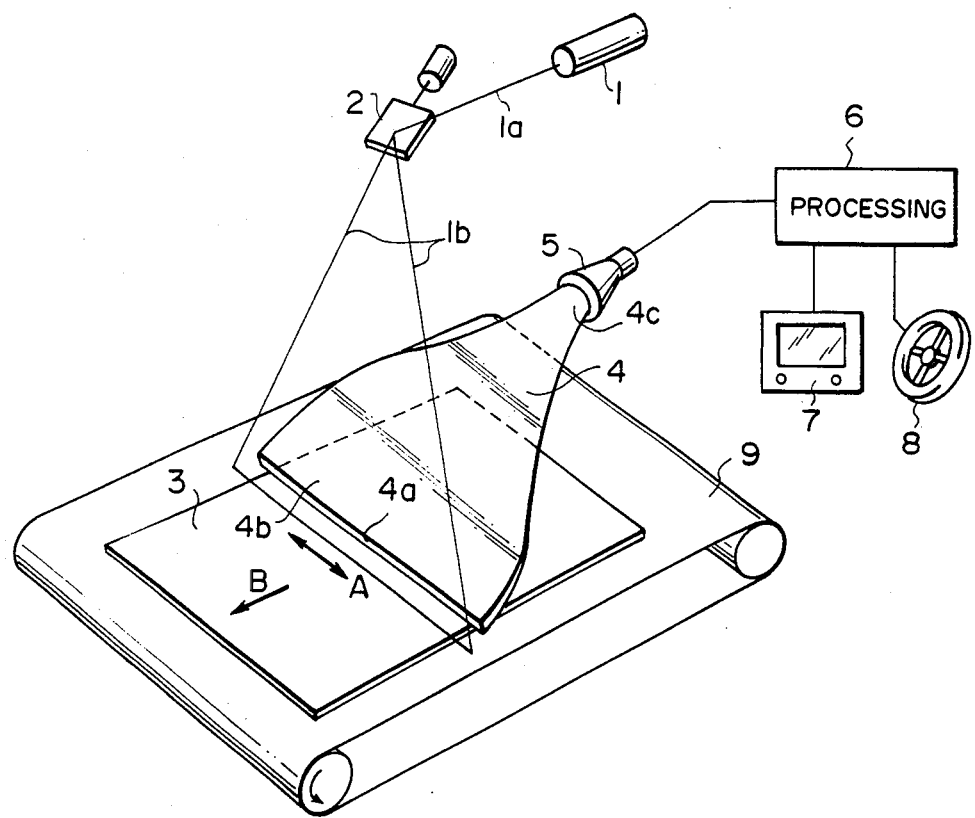
FIG. 1 is a schematic view showing an example of a radiation image read-out apparatus.
Figure 2:
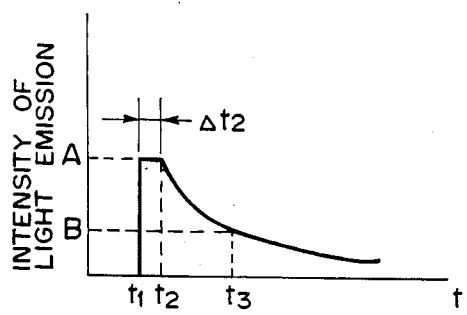
FIG. 2 is a graph showing the decay characteristics of an instantaneous light emission after-glow.
Figure 3:
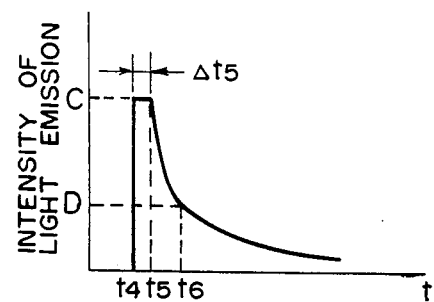
FIG. 3 is a graph showing the decay characteristics of a stimulated light emission after-glow.
Figure 4A:
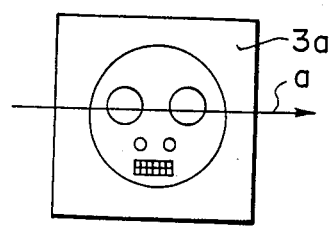
FIG. 4A is a schematic view showing a stimulable phosphor sheet carrying a radiation image of the head of a human body stored therein.
Figure 4B:
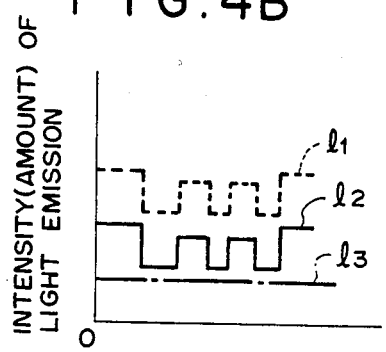
FIG. 4B is a graph showing the light emission intensity transmitted to a photomultiplier via a light guide member when the stimulable phosphor sheet shown in FIG. 4A is scanned by stimulating rays.
Figure 5:
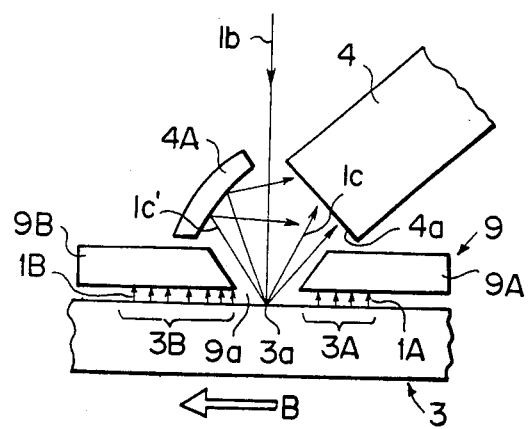
FIG. 5 is an enlarged sectional view showing the configuration of the aperture member at the scanning section of an embodiment of the radiation image read-out apparatus in accordance with the present invention.

Referring to FIG. 5, a stimulable phosphor sheet 3 carrying a radiation image stored therein is moved in the subscanning direction as indicated by the arrow B. The stimulable phosphor sheet 3 is scanned by a laser beam 1b as stimulating rays in the main scanning direction along a scanning line 3a. As the stimulable phosphor sheet 3 is exposed to the laser beam 1b, the portion exposed thereto emits light as indicated by 1c and 1c'. The emitted light 1c directly enters a light guide member 4 from its light input face 4a. The emitted light 1c' is reflected by a mirror 4A into the light input face 4a. The mirror 4A has a slightly concave surface and is positioned for efficiently guiding the light emitted by the stimulable phosphor sheet 3 upon stimulation thereof by the laser beam 1b to the light input face 4a of the light guide member 4.

In the stimulable phosphor sheet 3, a portion 3A which is scanned next emits an after-glow 1A of instantaneous light emission arising when the sheet 3 is exposed to a radiation to have the radiation image stored therein. A portion 3B scanned previously emits an afterglow 1B consisting of stimulated light emission afterglow and instantaneous light emission after-glow. Above the sheet 3 is positioned an aperture member 9 provided with an aperture 9a for allowing the laser beam 1b to pass therethrough, a light shielding section 9A for shielding the instantaneous light emission afterglow 1A, and a light shielding section 9B for shielding the stimulated light emission after-glow and the instantaneous light emission after-glow.

The aperture 9a of the aperture member 9 has a length in the main scanning direction which is equal to or larger than the width of main scanning, and a width in the sub-scanning direction which is equal to or larger than the diameter of the laser beam 1b. Also, the width of the aperture 9a in the sub-scanning direction is such that entrance of the light emitted by the stimulable phosphor sheet 3 upon stimulation by the laser beam 1b into the light input face 4a of the light guide member 4 is not obstructed. The end portions of the light shielding sections 9A and 9B which define the aperture 9a should preferably be shaped in the wedge form as shown in FIG. 5 so that the portions of the sheet 3 emitting the instantaneous light emission after-glow 1A and the stimulated light emission after-glow 1B are covered sufficiently and the light 1c and the light 1c' emitted by the sheet 3 upon stimulation thereof are allowed to enter the light guide member 4. However, the end portions of the light shielding sections 9A and 9B which define the aperture 9a may be shaped in any other forms.

I claim:

1. An apparatus for reading out a radiation image, which comprises:
   (i) a main scanning means for scanning a stimulable phosphor sheet, which carries a radiation image of an object stored therein, by stimulating rays in a main scanning direction,
   (ii) a sub-scanning means for scanning said stimulable phosphor sheet in a sub-scanning direction by moving said stimulable phosphor sheet with respect to said stimulating rays in a direction approximately at right angle with respect to said main scanning direction,
   (iii) a light guide member provided with a light input face extending in said main scanning direction, said light input face being positioned along and close to the main scanning line, so that light entering from said light input face is guided inside of said light guide member up to a light output face thereof,
   (iv) a photodetector closely contacted with said light output face of said light guide member, and (v) an aperture member positioned between the surface of said stimulable phosphor sheet and said light input face of said light guide member, said aperture member provided with an aperture allowing said stimulating rays to impinge upon said stimulable phosphor sheet for scanning it in the main scanning direction and for allowing the light emitted by said stimulable phosphor sheet upon stimulation thereof by said stimulating rays to enter said light input face of said light guide member, and light shielding sections positioned adjacently to said aperture on the front side and the rear side thereof in the sub-scanning direction.

2. An apparatus as defined in claim 1 wherein said aperture of said aperture member is defined by aperture edge portions having a wedge-like cross-section such that the edge of the wedge-like cross-section near said stimulable phosphor sheet forms an acute angle, and the edge thereof near said light guide member forms an obtuse angle.

3. An apparatus as defined in claim 1 wherein said aperture of said aperture member has a length in said main scanning direction which is at least equal to the width of scanning in said main scanning direction and a width in said sub-scanning direction which is at least equal to the diameter of said stimulating rays.

4. An apparatus as defined in claim 1, further comprising a mirror having a concave surface and positioned for guiding the light emitted by said stimulable phosphor sheet upon stimulation thereof by said stimulating rays to said light input face of said light guide member.

* * * * *